(12) United States Patent
Potthoff et al.

(10) Patent No.: US 9,783,685 B2
(45) Date of Patent: Oct. 10, 2017

(54) WATER-BASED PAINT COMPOSITION FOR AEROSOL CANS

(71) Applicants: Peter Kwasny GmbH, Gundelsheim (DE); BASF SE, Ludwigshafen (DE)

(72) Inventors: Holger Potthoff, Heilbronn (DE); Inge Kramer, Basel (CH); Manfred Dargatz, Worms (DE); Michaela Muller-Halanke, Ottersheim (DE)

(73) Assignees: Peter Kwasny GmbH, Gundelsheim (DE); BASF SE, Ludwigshafen (DE)

( * ) Notice: Subject to any disclaimer, the term of this patent is extended or adjusted under 35 U.S.C. 154(b) by 0 days.

(21) Appl. No.: 14/770,350

(22) PCT Filed: Mar. 5, 2014

(86) PCT No.: PCT/EP2014/054246
§ 371 (c)(1),
(2) Date: Aug. 25, 2015

(87) PCT Pub. No.: WO2014/135581
PCT Pub. Date: Sep. 12, 2014

(65) Prior Publication Data
US 2016/0002475 A1  Jan. 7, 2016

(30) Foreign Application Priority Data
Mar. 5, 2013  (DE) .................. 10 2013 003 653

(51) Int. Cl.
*C09D 5/02* (2006.01)
*C09K 3/30* (2006.01)
*C08K 5/06* (2006.01)
*C09D 133/08* (2006.01)

(52) U.S. Cl.
CPC ............... *C09D 5/021* (2013.01); *C08K 5/06* (2013.01); *C09D 133/08* (2013.01); *C09K 3/30* (2013.01)

(58) Field of Classification Search
CPC ......... C09D 5/021; C09D 133/08; C08K 5/06
See application file for complete search history.

(56) References Cited

U.S. PATENT DOCUMENTS 4,968,735 A * 11/1990 Page ....................... C09K 3/30
                                                    524/378
5,988,455 A * 11/1999 Pearson ................. C09D 5/021
                                                    222/402.1

* cited by examiner

*Primary Examiner* — Ling Choi
*Assistant Examiner* — Lanee Reuther
(74) *Attorney, Agent, or Firm* — Berliner & Associates

(57) ABSTRACT

The invention relates to a water-based paint composition for aerosol cans containing A) 55 to 75% w/w of a paint component, which contains 40 to 75% w/w, with respect to the paint component, of an acrylate-based film-forming formulation in an aqueous medium, up to 10% w/w of a water-miscible polar solvent, up to 30% w/w of customary pigments, up to 15% w/w of matting agents, 2 to 15% w/w of additives, and up to 40% w/w of added water, and B) 25 to 45% w/w of a propellant gas component which, based on the propellant gas component, contains at least 75% w/w of dimethyl ether.

13 Claims, No Drawings

WATER-BASED PAINT COMPOSITION FOR AEROSOL CANS

The invention relates to single-component water-based paint compositions comprising a paint component and a propellant gas component for discharge via pressurized containers or aerosol cans that may, for example, be used for decoration purposes and to apply protective coatings.

More and more stringent environmental protection legislation implemented during the last 20 to 30 years were aimed at reducing solvents and $CO_2$ emissions and the reason for making increased efforts to drastically cut down the amount of solvents in paints. This has led to the development of high-solids formulations and, moreover, of low-solvent or solvent free water-based paint systems.

For coatings and in particular also for decorative paint systems water-based paints have meanwhile been in widespread use and found acceptance not only in the do-it-yourself field. Also in the professional sector, for example for automotive and industrial paint coating applications such systems have met with increasing interest. However, the acceptance of such aqueous coating systems has been limited to the more conventional application methods easily implemented by brush, roller and spray gun. Only in exceptional cases are water-based paints used with aerosol cans (Aerosol Report FEA, 2011). This is also due to the fact that water-based paint systems capable of being applied via aerosol cans could not be made available so far since their storage stability as well as coating quality was still inferior to that of conventional systems.

Water dilutable spray paints for the do-it-yourself sector as they are for example offered under the tradename of "Belton®" do not reach the quality, durability, covering power, and gloss merits of two-component polyurethane paints as they are commonly Known and demanded in the professional field for example for automotive repair purposes.

For do-it-yourself use a one-component aqueous paint formulation on the basis of alkyd resins has been disclosed by DE 37 28 597. In U.S. Pat. No. 6,077,898 formulations on vinyl acetate basis have been described. However, the formulations of this type did not possess the high-grade paint properties of one-component water-based paints based on acrylates.

The filling of readily usable water-based paint formulations into spray cans with suitable additives such as cosolvents, surfactants, drying accelerators, etc. being added is described in publications U.S. Pat. No. 6,135,165 and DE 195 11 771. The formulations especially developed for use with spray cans, however, do not satisfy the quality requirements nowadays imposed with respect to paint properties and solvent respectively additive contents which, if possible, should not exceed 10% of the formulation.

Binding agents and paint formulations on acrylate basis especially developed for the application by means of spray cans have also been described in patent literature. Examples here are publications WO 2001/064802, U.S. Pat. No. 5,988,455, U.S. Pat. No. 5,536,762, and JP 05/070713. These water-based paints on acrylate basis, however, have not come up to expectations with respect to their storage stability in a spray can with customary propellants, such as dimethyl ether (DUB), propane and/or butane. The storage life should in any case amount to at least 12 months, preferably 18 months in contact with the propellant gas in a spray can.

In view of the above it is the objective of the present invention to provide a paint formulation with aqueous binding agents that comprises less than 10% w/w of organic solvents and 15% w/w of additives in the binding agent component of the spray can, has a storage stability under the influence of the propellant gas of at least 12 months in the aerosol can offers mechanical stability with respect to shearing forces arising when the paint formulation is sprayed, dries sufficiently fast, and is characterized by high build, opacity the desired gloss level and hardness. In view of the good results achieved with conventional paint formulations on acrylate basis the paint formulation should also fee an acrylate paint.

This objective is reached by providing a water-based paint composition as has boon defined in Claim 1. Preferred embodiments are specified in and can foe seen from the respective subclaims.

The water-based paint composition according to the invention consists of a paint component A and a propellant gas component B. The paint component amounts to 55 to 75% w/w of the total composition, the propellant gas component ranges between 25 and 45% w/w. Based on the propellant component the propellant gas component consists of dimethyl ether in the amount of at least 75% w/w. Minor amounts of propane and/or butane may also be present and, moreover, $CO_2$, $NO_2O$, compressed air, nitrogen and/or argon serving as supporting propellants.

The DME content of the propellant gas component preferably amounts to more than 90%. Especially preferred, the propellant gas composition consists of dimethyl ether.

As a rule, the paint component consists of the binding agent, water, where applicable pigments, additives, and where appropriate fillers, matting agents, and one or several cosolvents. The cosolvents, if present, are water-miscible and for that reason also polar to make sure they are capable of mixing with water.

The paint component amounts to between 55 and 75% w/w of the water-based paint composition, preferably ranges between 55 and 65% w/w. This paint component contains, relative to the paint component, 40 to 75% w/w of a film-former formulation on acrylate basis. Preferred are acrylate copolymers and, especially preferred, styrene acrylate copolymers. In the binding agent formulation the film-forming agents are present in an aqueous medium, for example in a colloidal aqueous dispersion, in the form of a conventional latex or as a core-shell structure. In the case of conventional latex a close particle size distribution is considered advantageous.

In the film former formulation the film-forming agent itself amounts to 30 to 55% w/w. In particular 40 to 50% w/w and especially preferred 43 to 47% w/w, with the balance mainly consisting of water.

Styrene acrylate copolymers have already been referred to as an example of suitable film-forming agents. These may be present in the aqueous medium with the solids contents specified hereinbefore.

The film-forming agents usually have a minimum film forming temperature MFT ranging between 5 and 60° C. and in particular of 20 to 45° C. In the styrene acrylate copolymers the styrene content is preferably below 40% w/w, in particular below 30% w/w. The acid number, for example, ranges between 20 and 70 mg KOH/g and in particular between 25 and 50 mg KOH/g.

With respect to stability and functioning of the inventive water-based paint compositions for aerosol cans the manner and technique of mixing is of great importance. It is of special significance for the film-forming formulation for the binding agent component to the provided as formulation in an aqueous medium. Admixed to this formulation are further additives and solvents, and if considered necessary also matting agents, pigments, and fillers, finally the propellant is added Film former formulations in aqueous media, in particular dispersions and lattices, are extremely sensitive to variations m the polarity of the aqueous system. Both the additives and the cosolvents and last not least the propellant act on and cause the polarity to vary. Especially, the amount of dimethyl ether that is added in accordance with the invention has a significant influence in this respect.

DME is a traditionally available liquefiable gas having a boiling point of −23° C. at standard pressure and under 5 bar pressure of 24° C. 35% w/w of DME is soluble in water.

The solubility of DME in water is of significance with respect to the storage stability of the inventive water-based spray compositions in the spray can. Due to its solvent properties DME has great influence on the condition of the binding agent in the binding agent formulation, i.e. when pressurizing the completely filled aerosol can DME may cause the binding agent component to change its state.

Moreover, DME influences the aerosol formation to a great extent and thus affects the painting results achievable with the water-based paint preparation.

Therefore, fine-tuning the film former formulation, cosolvents, additives, matting agents, pigments, filler substances, and propellants is thus a crucial issue when formulating the water-based paint preparations as provided by the present invention. All components must be carefully attuned; such harmonization may, however, be carried out by a person skilled in the art by checking suitable formulations according to a standard method.

The polarity of the water-based paint composition may be modified by adding cosolvents and, as the case may be, co-propellants such as, for example propane and/or butane.

The film-forming agents employed according to the invention on the basis of acrylate or styrene acrylate copolymers possess the known polymer structures. Suitable are colloidal polymer dispersions, conventional lattices, lattices with primarily polymeric stabilization, lattices with controlled molar mass distribution, lattices with, for example, hollow spheres, core-shell structures, blackberry structures, inverse structures. Systems may either be of self-crosslinking nature or may be hybrid systems, for example acrylate polyurethane as well as mixtures of the structures referred to. The film forming agents may be modified by adding mono-, di- or poly-isocyanates, -carboxylates and/or by epoxides. Film formers on other than acrylate basis may also be added.

For the purpose of checking and selecting suitable film forming agents aqueous dispersions are mixed with a defined volume of water, 0.4% w/w of defoaming agent and 0.5% w/w of wetting agent, 5% w/w of ethanol or propanol as well as 0.5% w/w of butyl glycol, then filled in spray cans and pressurized at 4 bar with DME in a ratio of 60:40. The product is stored at room temperature, possibly also at higher temperatures, and checked for its performance characteristics after defined periods of time.

Aside from suitable film-forming agents the selection of the solvents for atomization and film forming of the water-based paint for spray cans is of significance. As solvents water-miscible polar solvents are used, in particular alcohols, glycols, esters. Minor amounts of unpolar solvents may be present as well such as benzines or Texanol as they are frequently present in pre-formulated components. Preferred are alcohols having with up to 4 carbon atoms, in particular ethanol, isopropanol and propanol, glycols and diglycols, especially butyl glycol, solvents on the basis of propylene glycol (Dowanol DPnB, Dowanol PM), Proglyde DMM, ethyl acetate. The solvents may be put to use individually or as a blend, with blends being preferred. The overall proportion of the solvents in the water-based paint composition in the spray can amounts to less than 8% w/w relative to the water-based paint composition, with less than 6% w/w being preferred.

Preferred solvents are ethanol and/or propanols and/or butyl glycol, in particular in the form of a blend. They yield excellent results with respect to the paint's gloss, film forming quality, freedom from streaks and specks.

The additives or stabilizers ensuring high gloss retention, good stability and storage life and build of the water-based paint aerosols are as a rule selected from the group of the wetting agents, slip and leveling additives, thickeners, corrosion inhibitors, film-forming aids and defoamers. These additives are present in and relative to the binding agent component in an amount ranging between 2 and 15% w/w, and usually amount to less than 5% w/w in the water-based paint composition. It goes without saying that blends of additives having similar effects may be employed as well.

Dispersing additives and/or wetting agents are used to counteract flocculation of most finely distributed pigments. Suitable products are polyether siloxane copolymers and organically modified polysiloxane, as they are for example offered by BASF under the type designations EFKA 3580 and 7380, by the company of BYK under BYK345, 346, 347, 349, 3455 and Bykotol AQ as well as by Theo Goldschmidt under Wet 280 Glide 110, 406, 450 and by OMG Borchers under Borchi Gol LA1 and LA50.

Suitable defoamers are modified polydimethylsiloxanes, for example Dehydran 1293, 2293 as well as EFKA 2550, 2580, Foamstar A38, and MF324 offered by BASF, Drewplus S4374 by Ashland, Airex 901W, Foamex 805, and 822 by Theo Goldschmidt, Borchi Gol LA200 and Bochers AF0670 by OMG Borchers.

As corrosion inhibitors for example products based on organic acids, free of nitrite, phosphate, and borate can be used, for example Raybo 90 by the company of Raybo.

Thickeners and thixotropic agents have an influence on the stability of the water-based paint in the spray can since they are capable of counteracting demixing. They are also used to adjust the rheological properties of the paint and act on paint characteristics such as build, adherence, and opacity. Suitable thickening and thixotropic agents are, for instance, hydrophobically modified ethoxilated urethanes as offered by BASF under the name of Collacral PU70, DSX3290, and 3291, or by the company of BYK under designation BYK425, by Theo Goldschmidt under Viskoplus 3030, 3060, by OMG Borchers under Borchi Gel 0620, PW25, and THIX921. Thickeners and thixotropic agents may be present in the paint component in an amount ranging between 0.2 and 4.0% w/w.

Defoamers are another element of the additives and are capable of suppressing or making the foaming bubbles burst. Defoamers must be carefully matched to the respective aqueous system and application. Examples of suitable defoaming agents have already been given above. The preferred amount ranges between 0.1 and 2% w/w, in particular between 0.1 and 1% w/w in the binding agent component, and especially preferred between 0.2 and 0.8% w/w.

Generally, it has proved advantageous to use for the additive blends several additives of one and the same category.

Moreover, the compositions provided by the present invention may still contain in the binding agent component agents to improve the surface smoothness and hardness, for example an anionic emulsion of a modified paraffin wax, of which the company of BYK offers a plurality of different types under the designation of "Aquacer".

Furthermore, wetting agents may be included such as, for example, organically modified polymers with pigment-affine groups. For this, a plurality of products may be put to use as offered by the companies of Theo Goldschmidt (Dispers), BASF (Dispex, EFKA 6225), and OMG Borchers (Borchi Gen).

The paint component may last not least also contain amines for pH regulation, aids for film forming purposes and the like. These agents are as a rule present in an amount of up to 0.3% w/w based on the binding agent component.

The inventive water-based paint compositions may be prepared in the form of clear coats but may also be provided in any desired color. For this purpose, they contain pigments in an amount of up to 30% w/w of the paint component, said pigments may as a rule be added as pastes, preparations or in directly ground form. The pigments are, for example, based on titanium dioxide, soot, phthalocyanines, DDPs, molybdates, perlenes, quinacridones, iron oxides, bismuth vanadates, and other coloring systems. Examples of suitable preparations are available under the designation of Luconyl and XFast produced by the company of BASF. Pigment preparations are preferably put to use together with dispersing and wetting agents. The additives aimed at assisting pigmentation are present, based on the paint component, in an amount ranging between 0.1 and 4% w/w, preferably ranging between 0.1 and 2% w/w, and especially preferred between 0.1 and 1.0% w/w.

Moreover, the paint component may contain matting agents in an amount of up to 15% w/w, based on the paint component. Suitable are organic and inorganic matting agents, for example those based on silicic acid.

The invention is explained in more detail by way of the following examples.

EXAMPLE 1

A paint component was produced using the following constituents:

| | |
|---|---|
| Styrene acrylate copolymer dispersion (aqueous dispersion, solids content >40% w/w) | 60.9% w/w |
| Defoaming agent (modified polydimethylsiloxane) | 1.0% w/w |
| Wetting agent (organically modified polysiloxane) | 0.1% w/w |
| Thickening agent (hydrophobically modified ethoxylated urethane) | 0.5% w/w |
| n-propanol | 3.0% w/w |
| Dipropylene glycol | 3.0% w/w |
| Fully demineralized water | 31.5% w/w |

The paint component was mixed with dimethyl other in an aerosol can in a ratio by weight of 65:35. A water-based paint composition offering good storage stability was obtained that yielded a paint featuring high gloss and good flowing properties.

EXAMPLES 2 TO 4

The paint components had the following compositions:

| | | | |
|---|---|---|---|
| Acrylate copolymer, solids content >40% | 55.83% | 53.53% | 53.53% |
| Defoaming agent | 0.24% | 0.23% | 0.23% |
| Wetting agent | 0.18% | 0.17% | 0.17% |
| n-propanol | 1.80% | 4.75% | 5.35% |
| Dipropylene glycol | 1.80% | | |
| Proglyde DMM | | 1.20% | |
| Texanol | | | 0.60% |
| Thickening agent | 0.15% | 0.12% | 0.12% |
| Fully demineralized water | 40.00% | 40.00% | 40.00% |

The above listed paint components were charged in aerosol cans with dimethyl ether in a ratio by weight of 60:40. The blends offered good storage stability (>1 year) and yielded a quickly drying paint of high stability, good flowing properties, and high gloss.

EXAMPLE 5

A paint component was composed as follows:

| | |
|---|---|
| Styrene acrylate dispersion in water with a solids content of 46% | 90 parts by weight |
| Defoaming agent | 0.30 parts by weight |
| Wetting agent | 0.20 parts by weight |
| n-propanol | 4.0 parts by weight |

73 parts by weight of the above paint component were mixed with 5 parts by weight of XFast red 3855 and 22 parts by weight of water and thus yielded the pigmented paint component. The pigmented paint component was mixed with dimethyl ether as propellant in an aerosol can in a ratio by weight of 65:35.

EXAMPLE 6

A water-based finishing paint, red, matt, was composed as follows:

| | |
|---|---|
| Styrene acrylate dispersion in water with a solids content of 46% | 91.5 parts by weight |
| Defoaming agent | 0.9 parts by weight |
| Wetting and flow-promoting agent | 0.6 parts by weight |
| Thickening agent | 0.5 parts by weight |
| n-propanol | 4.5 parts by weight |
| Butyl glycol | 2.0 parts by weight |

60 parts by weight of the above described paint component were mixed with 5 parts by weight of XFast red 3860, 3.8 parts by weight of a micronized wax, 0.2 parts by weight of precipitated silicic acid, and 31 parts by weight of fully demineralized water.

The pigmented and matted paint component was mixed with dimethyl ether as propellant in an aerosol can in a ratio by weight of 65:35.

The invention claimed is:
1. Water-based paint composition for aerosol cans containing
A) 55 to 75% w/w of a paint component, which contains 40 to 75% w/w, with respect to the paint component, of an acrylate-based film-forming formulation in an aqueous medium, the film-forming formulation having a solids content of between 40 and 50% w/w and containing a styrene acrylate copolymer of less than 30% w/w which is present in a colloidal aqueous dispersion or as core-shell structure, up to 10% w/w of a water-miscible polar solvent, up to 30% w/w of pigments, up to 15% w/w of matting agents, 2 to 15% w/w of additives, and up to 40% w/w of added water, and B) 25 to 45% w/w of a propellant gas component which, based on the propellant gas component, contains at least 75% w/w of dimethyl ether.

2. Water-based paint composition according to claim 1, characterized in that the acrylate based film-forming agent of the paint component has a minimum film forming temperature MFT ranging between 5 and 60° C.

3. Water-based paint composition according to claim 2 in which the film-forming agent of the paint component has a minimum film forming temperature MFT ranging between 20 and 45° C.

4. Water-based paint composition according to claim 1, characterized in that the proportion of water-miscible polar solvents amounts to less than 6% w/w of the paint component.

5. Water-based paint composition according to claim 1, characterized in that the water-miscible polar solvents are alcohols.

6. Water-based paint composition according to claim 5, characterized in that the alcohols are C2 to C4 alcohols, glycols, diglycols or monoethers of glycols or diglycols with C1 to C4 alcohols.

7. Water-based paint composition according to claim 1, characterized in that the paint component contains defoamers in the amount of between 0.1 and 2.0% w/w.

8. Water-based paint composition according to claim 1, characterized in that the paint component contains thickening and thixotropic agents in the amount of between 0.2 and 4.0% w/w.

9. Water-based paint composition claim 1, characterized by 30 to 40% w/w of propellant gas component.

10. Water-based paint composition according to claim 1, characterized by at least 90% w/w of dimethyl ether in the propellant gas component.

11. Water-based paint composition according to claim 1, characterized in that the propellant gas component consists of dimethyl ether.

12. Water-based paint composition according to claim 1, contained in an aerosol can.

13. A method of using the water-based paint composition of claim 12, comprising applying a coating of the paint as decorative or protective paint.

* * * * *